Jan. 28, 1969  W. L. COLGAN  3,424,036
SPEED CHANGING DEVICE
Filed Jan. 17, 1967
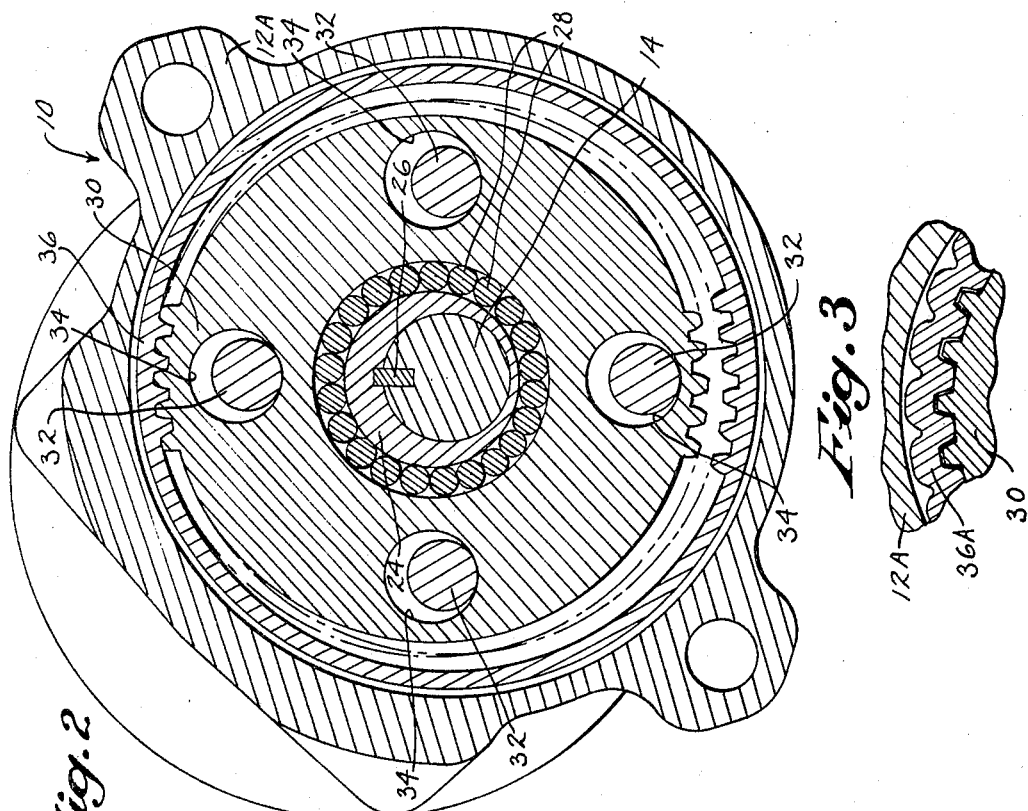
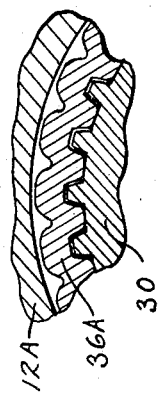
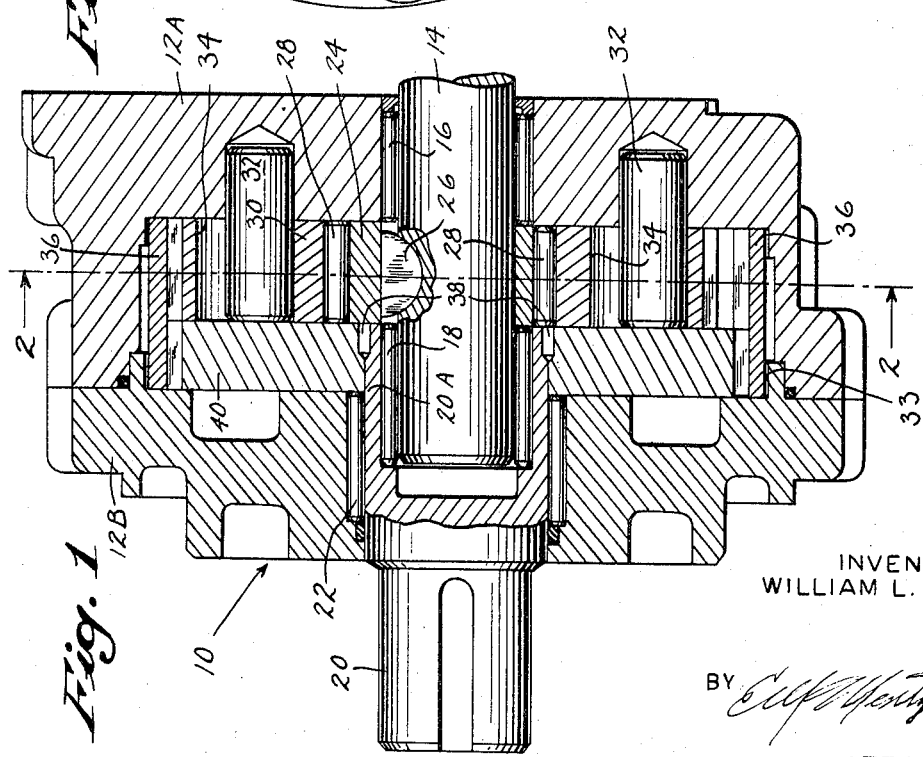
INVENTOR
WILLIAM L. COLGAN
BY
ATTORNEY United States Patent Office
3,424,036
Patented Jan. 28, 1969

3,424,036
SPEED CHANGING DEVICE
William L. Colgan, West Allis, Wis., assignor to Rex Chainbelt Inc., Milwaukee, Wis., a corporation of Wisconsin
Filed Jan. 17, 1967, Ser. No. 609,895
U.S. Cl. 74—805
Int. Cl. F16h 1/28
7 Claims

ABSTRACT OF THE DISCLOSURE

In the speed reducer, an externally toothed input gear is mounted for orbital rotational movement within the reducer housing, so that the outermost teeth of the input gear are successively engageable with the internal teeth of a floating ring gear. Lateral movement of the ring gear relative to the housing is limited, and the ring gear is yieldingly connected with a journaled output shaft so that the lateral components of off-set moment forces set up due to the orbiting input gear are absorbed in the housing and are not transferred to the output shaft bearing.

---

This invention relates generally to speed changing devices, and more particularly to an internal orbital gear reducer.

Gear reduction units employing internal orbiting gears are presently available on the market and are popular because they provide in-line shafting and relatively large gear reduction ratios in a comparatively small space. In the usual type of available unit, one or more input gears are eccentrically mounted on the input shaft and arranged to simultaneously orbit and rotate about their axes, these gears being enmeshed with a stationary, internally-toothed ring gear usually formed by machining gear teeth on the internal surface of the reducer housing. The output shaft is journaled in the unit housing and connects with a crank plate or disc, to which are attached a plurality of drive pins that extend eccentrically through circular openings in the input gears, the openings being sized and arranged to provide the necessary orbital movement of the pins therein to effect rotation of the crank plate as the position of the orbiting gear advances with respect to the housing ring gear.

Inherently, such units drive the output shaft in the direction opposite from the direction of rotation of the input shaft; moreover, the offset force exerted on the ring gear by the eccentrically orbiting input gear is carried through the drive pins (which act as cantilevers) and disc crank and is exerted on the bearing journaling the output shaft in the housing. Thus the orbiting input gear, being laterally offset from the support point of the output shaft (i.e., the shaft bearing), sets up a moment force that is transferred via the drive pins and crank plate to the bearing. This abnormal force on the output shaft bearing necessitates that it be of more sturdy construction (i.e., greater size and capacity) than an uncantilevered bearing support would be. The problem is, of course, more pronounced where high torque is being transmitted. This problem can be alleviated by providing multiple orbiting input gears so disposed as to simultaneously engage the ring gear at equally spaced locations around its circumference. This expedient, however, greatly increases the manufacturing costs of the unit; moreover, the problem can never be completely eliminated since, although all of the input gears exert the same force on the ring gear, each input gear is laterally spaced a different distance from the affected bearing, and a net moment force on the bearing is inevitable.

It is therefore an object of the present invention to provide an internal orbital gear reducer in which the moment force exerted on the output shaft bearing due to the offset force exerted by the orbiting ring gear is virtually eliminated. It is a further object of the present invention that this elimination of moment forces be accomplished in a gear reduction unit employing a single orbiting input gear. It is a corresponding object of the present invention to provide an internal orbital gear reduction unit of less expensive construction than has heretofore been known, the unit being nevertheless capable of transmitting high torque. A still further object of the present invention is to provide a compact gear reduction unit having in-line shafts that rotate in the same direction.

To attain these and other objects, there is provided, according to the present invention, a speed changing device comprising a housing having an input shaft and an output shaft rotatably mounted thereon, and positive coupling mechanism disposed within the housing for rotating the output shaft at a speed different than and in response to the rotation of the input shaft. The coupling mechanism includes an externally-toothed pinion gear connected with and mounted for orbital movement about the input shaft, and an internally-toothed ring gear successively engageable with the laterally outermost teeth of the pinion gear upon orbital movement thereof. Lateral movement of the ring gear within the housing is limited; moreover, the ring gear is preferably free to rotate within the housing. The ring gear is yieldingly connected to the output shaft for the transference of rotation thereto, the interconnection preferably being provided by an output gear meshed with the ring gear. The yieldable characteristic of the connection affords accommodation of angular displacement of the ring gear due to the offset force exerted thereon by the pinion gear, and may be effected by providing a relatively loose mesh between the ring and output gears and/or by forming the ring gear of a material and with dimensions such that it is deformable upon the normal eccentric exertion of force by the pinion gear thereon.

These and other objects and advantages will appear in the following detailed description of the invention having reference to the accompanying drawings in which:

FIGURE 1 is a longitudinal sectional view, with parts thereof broken away for clarity, of a speed changing device constructed according to the present invention;

FIG. 2 is a sectional view taken along lines 2—2 of FIG. 1; and

FIG. 3 is a fragmentary side elevation of an alternate form of ring gear, in situ, for use in the device shown in FIGS. 1 and 2.

Referring to the FIGS. 1 and 2, the depicted embodiment of the invention is a speed or gear reducer 10, the working elements of which are contained within a generally cylindrical housing 12 consisting of a body portion 12A and mating cover portion 12B, which portions are held together by suitable fasteners or bolts (not shown). Extending through an opening in the body portion 12A of the housing is an input shaft 14. An output shaft 20 is axially aligned with the input shaft 14 and projects through a suitable opening in the cover portion 12B of the housing. The inboard end 20A of the output shaft 20 is formed with an axial recess in which is received the inboard end of the input shaft 14, the adjacent cylindrical surfaces of the shafts at their overlapping portions being mutually journaled by a bearing assembly 18, preferably of the needle or roller type. The input and output shafts 14 and 20 are respectively journaled in the housing portions 12A and 12B by means of bearing assemblies 16 and 22, again preferably of the roller or needle type. It should be recognized that, in service, the input shaft 14 is connected to a suitable rotary driving source such as an electric or hydraulic motor, and the output shaft is connected to a device or article to be driven.

The working elements of the reducer 10 are arranged within a cylindrical cavity formed in the body portion 12A of the housing, and include a circular eccentric member 24 that is connected by a key 26 to the input shaft 14 for rotation therewith. A circular, externally-toothed pinion gear 30 is journaled on the outer circumference of the eccentric member 24 by a roller bearing assembly 28 for orbital movement, in response to rotation of the input shaft, about an internally-toothed annular ring gear 36 with which the pinion gear 30 is meshed. Rotation of the pinion gear 30 about its axis is prevented by a set of four pins 32 which are connected to the side walls of the body portion 12A of the housing and project into the housing cavity and through a corresponding number of circular openings 34 equally spaced around the pinion gear 30, the openings 34 being of such a size and arrangement as to permit only orbital (non-rotational) movement of the gear 30 within the housing cavity.

In the disclosed embodiment, the ring gear 36 is free to rotate within the housing 12, and for this purpose a small clearance 33 is provided between the outside diameter of the ring gear 36 and the inside diameter of the housing cavity 11. The significance of this clearance will be discussed in greater detail hereinafter. Lateral movement of the ring gear 36 is limited by adjacent parts of the housing 12.

Rotation of the ring gear 36 is preferably transferred to the output shaft 20 by means of an externally-toothed output gear 40, which is keyed to the shaft 20 by pins 38 and which is in constant mesh with the ring gear 36 so as to act as a gear or spline coupling.

From the above description, it can be appreciated that, as the input shaft 14 is rotated in a given direction, the pinion gear 30 will orbit about its axis, rotation thereof being prevented by the pins 32. By virtue of this orbital movement, the radially outermost teeth of the pinion gear 30 will successively engage the teeth of the ring gear 36, the net result being that for each orbit of the pinion gear 30, the ring gear 36 will be advanced within the housing 12, in the direction of rotation of shaft 14, by an amount proportional to the difference in the number of teeth in the gears 30 and 36. For example, if the pinion gear 30 is formed with fifty-seven teeth and the ring gear 36 is formed with sixty teeth, one rotation of the shaft 14 (corresponding to one orbit of the pinion gear 30) will advance the ring gear a distance along the pitch circle of ring gear 36 corresponding to the pitch of three teeth. That is to say that the ring gear 36 will rotate at a rate equal to $3/60$ (or $1/20$) of the speed of the input shaft 14. The output shaft 20, being directly coupled with the ring gear 36 through output gear 40, is driven at the same speed as the ring gear 36, thus affording a net speed reduction of 20 to 1.

At any given time, the pinion gear 30 engages the ring gear 36 at only one location on its circumference. Thus, as pinion gear 30 rotates, it exerts a rotating force a component of which is directed radially outward from the ring gear 36. If the connection between the ring gear 36 and the output shaft 20 were rigid, this radial force would be transferred to the housing portion 12B through bearing 22, i.e., a moment equal to the engaging force by the gears 30 and 36 times the lateral distance between the effecting centers of the bearing 22 and the pinion gear 30, would be imposed on the bearing 22. This would require that the bearing 22 be of sturdier construction than would normally be expected for the apparent service. To alleviate the problem caused by the offset force between the orbiting pinion gear 30 and ring gear 36, the connection between the ring gear 36 and output shaft 20 is made non-rigid, i.e., the shaft 20 is yieldingly connected with the ring gear 36 so as to accommodate angular displacement therebetween, thereby allowing transference (short-circuited as it were) of the troublesome moment force into the housing 12 prior to its being transmitted to the output shaft journal bearing 22. Thus, the bearing 22 is subjected substantially only to rotational forces imposed by the ring gear and not to moment forces.

This yielding connection between the ring gear 36 and output shaft 20 may be provided in several ways. Assuming the output gear 40 to be rigidly connected to the output shaft 20 (as by pins 38), the ring gear 36 and output gear 40 may be sized so as to afford a relatively loose mesh that will allow a limited amount of angular displacement of the ring gear 36 relative to the output gear 40. For example, and not by way of limitation, it has been found that by forming the teeth of the output gear 49 with an effective pitch diameter about 0.005 inch less than the pitch diameter of the teeth on the ring gear 36, sufficient interplay is afforded so as to allow the necessary relative movement to transfer the moment force directly into the housing 12 through engagement with the lateral ends of ring gear 36 with the side walls of the housing cavity. Alternatively, or in addition, the ring gear 36 may be formed of a material and with dimensions such that it is deformable upon the normal eccentric exertion of force by the pinion gear 30 thereon, whereby the moment-producing eccentric force is transferred directly from the ring gear 36 to the housing 12 through the inner wall of the housing cavity. Deformation of the ring gear 36 by exertion of force by the pinion gear 30 will tend to oblate the ring gear 36 as well as flex or twist it within the cavity, so that contact with the inner wall of the housing cavity could occur on the circumference or the side walls of the cavity. Again, by way of example and not limitation if a "bearing fit" (about 0.003 inch difference between the outside diameter of ring gear 36 and the inside diameter of the cavity) is provided, sufficient deformation of the ring gear 36 could occur to accomplish the desired direct transference of moment to the housing 12.

It will be appreciated that, by applying the driving force to the shaft, the above described unit would perform as a speed increaser rather than a speed reducer.

In FIG. 3 there is shown a particular form of ring gear 36A that has been found to be advantageous as regards its ability to be deformed as described above. In this embodiment, the ring gear 36A is of uniformly narrow cross-section and is formed on its outer surface with indentations (of substantially the same shape as the gear tooth recesses on the inner surface) at locations radially opposite the location of the teeth on the inner surface, thus forming a more or less corrugated circumferential cross-section.

The foregoing description of the invention and of the manner and process of making and using it sets forth the best mode or modes of carrying out the invention as presently contemplated. The following claim or claims particularly point out and distinctly claim the subject matter which is regarded as the invention.

What is claimed is:

1. A speed changing device comprising a housing, first and second shafts rotatably mounted on said housing, and means disposed within said housing coupling said shafts for rotation of the second at a speed different than and in response to the rotation of the first, said means comprising an externally-toothed gear connected with and mounted for orbital movement about said first shaft, an internally-toothed ring gear successively engageable with the radially outermost teeth of said externally-toothed gear upon orbital movement thereof, means on said housing limiting lateral movement of said ring gear within said housing, and means connecting said ring gear with said second shaft for transferring rotation therebetween, said ring gear being formed of material and with dimensions such that it is limitedly deformable upon the normal eccentric exertion of force between said externally-toothed gear and said ring gear, whereby angular displacement between said ring gear and said second shaft due to the offset force exerted between said ring gear and said externally-toothed gear is accommodated.

2. The invention according to claim 1 wherein said ring gear is of uniformly narrow cross-section and is formed on its outer surface with indentations at locations radially opposite the location of the teeth on the inner surface.

3. The invention according to claim 1 wherein said device is a speed reducer, said first shaft is an input shaft, said second shaft is an output shaft, said externally-toothed gear is a pinion gear, said ring gear is free to rotate within said housing, and means carried by said housing are provided for restraining said pinion gear from rotation.

4. The invention according to claim 3 wherein said rotation transferring means includes an output gear, and said pinion gear and output gear are engaged with said ring gear at opposite ends thereof.

5. The invention according to claim 4 wherein the ends of said ring gear fit closely within said housing, whereby lateral forces due to angular displacement of said ring gear relative to said output gear are transferred directly from said ring gear to said housing.

6. The invention according to claim 5 wherein said output gear is formed with teeth on its outer circumference, which teeth remain in constant mesh with adjacent internal teeth of said ring gear.

7. The invention according to claim 5 wherein said pinion gear comprises the sole driving member enmeshed with said ring gear.

References Cited
UNITED STATES PATENTS

| | | | |
|---|---|---|---|
| 3,013,447 | 12/1961 | Hils et al. | 74—805 |
| 3,217,566 | 11/1965 | Samson | 74—804 |
| 3,320,828 | 5/1967 | Grant | 74—804 X |

ARTHUR T. McKEON, *Primary Examiner.*